April 13, 1965  W. J. KRUPICK ETAL  3,178,599
PERMANENT MAGNET D.C. TORQUER
Filed Jan. 23, 1962  2 Sheets-Sheet 1

WALTER J KRUPICK
HERBERT BINDER
INVENTORS

BY
ATTORNEYS

April 13, 1965   W. J. KRUPICK ETAL   3,178,599
PERMANENT MAGNET D.C. TORQUER
Filed Jan. 23, 1962   2 Sheets-Sheet 2
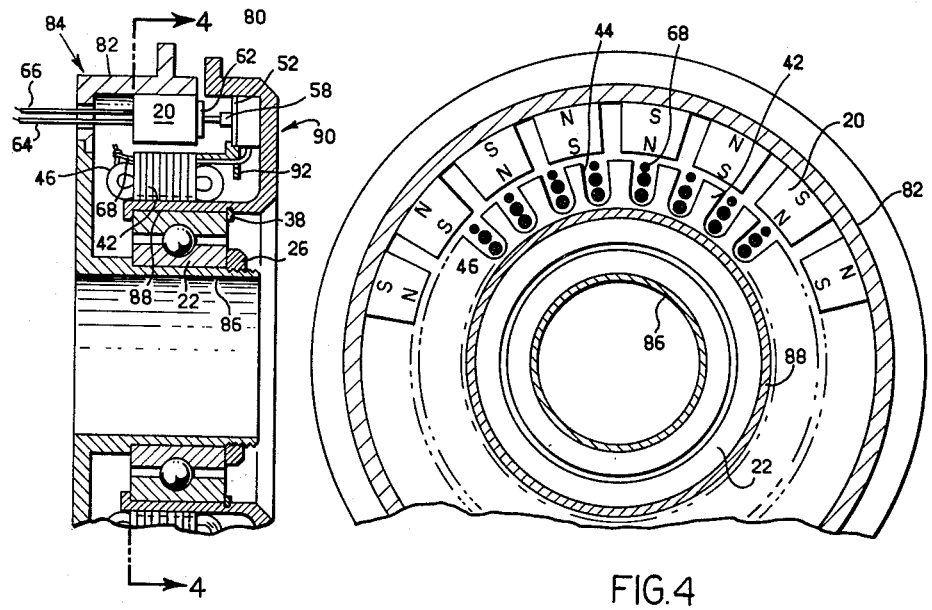
FIG. 3
FIG. 4
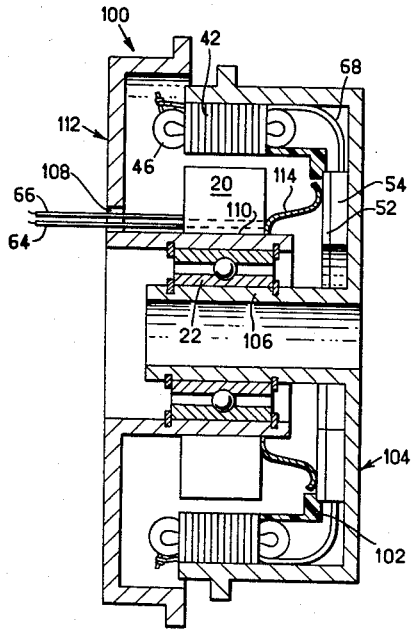
FIG. 5
WALTER J. KRUPICK
HERBERT BINDER
INVENTORS
BY S. A. Giarratana
ATTORNEYS

United States Patent Office 3,178,599
Patented Apr. 13, 1965

3,178,599
PERMANENT MAGNET D.C. TORQUER
Walter J. Krupick, Franklin, and Herbert Binder, Red Bank, N.J., assignors to General Precision Inc., Little Falls, N.J., a corporation of Delaware
Filed Jan. 23, 1962, Ser. No. 168,061
1 Claim. (Cl. 310—154)

The present invention relates to permanent magnet D.C. torquers for gyroscopes and inertial platforms, and more particularly to a permanent magnet D.C. torquer having a printed circuit commutator.

Prior art D.C. torquers used conventionally designed permanent magnet D.C. motors with their commutators of solid copper bars either inserted in slots or held together by a steel or molded plastic ring attached to the shaft of the armature. In some of the designs the permanent magnets are embedded in steel holding structures which act as pole pieces and magnet supports. In other designs the magnets are cast into a single multipole-salient pole unit. All of these prior art constructions require high input power for given output torques and, therefore, have low efficiencies. In addition the solid bar commutators attached to the armature shaft made the armature excessively long. Solid bar commutators which were inserted into slots made the unit shorter, but used much-needed copper space. The permanent magnets which were embedded in the steel holders were inefficient, due to the fact that the holder shunted a large part of the flux and prevented it from appearing in the air gap where it served a useful purpose. The one-piece multipole magnets were inefficient because they could not be made from highly oriented magnetic material.

The present invention overcomes these disadvantages by providing a D.C. torquer comprising a plurality of radially oriented circumferentially disposed permanent magnets of highly oriented magnetic material fixed on a stator in position to cooperate with a plurality of coils wound on a rotatable armautre and energizable by D.C. current to create a torque between the armature and stator. The electrical connection to each of the coils is made through a unique printed circuit commutator which takes up very little axial space. Spring loaded brushes are mounted on the end of the magnet assembly and slidably engage the face of the printed circuit to control the flow of current through the coils in response to the position of the coils relative to the magnets. With this construction, the space which was previously used for commutators can be filled with additional copper in the coils to increase the efficiency of the unit. The rotor with its coils and the commutator are made as one subassembly which is mounted within a highly permeable housing. The use of the highly permeable housing further conserves space and weight by eliminating the need for a separate magnetic shield and return path. The attachment of the brush assembly to the magnet assembly uses space that is normally lost and thus results in a further saving in the size of the envelope.

Accordingly, it is one object of the invention to provide a D.C. torquer having low input power requirements, high output torque and small size.

It is another of the invention to provide a D.C. torquer having a printed circuit board commutator which takes up very little axial room and does not use up much-needed copper space.

It is a further object of the invention to provide a D.C. torquer employing individual permanent magnets with highly oriented magnetic material in an overall arrangement which results in a high energy product.

It is a still further object of the invention to provide a D.C. torquer having a printed circuit board commutator wherein the brushes engaging the commutator are positioned in normally lost space within the unit to enable the size of the unit to be held to a minimum.

It is a still further object of the invention to provide a D.C. torquer of the type described above having a coil and laminated armature construction which reduces ripple torque to a minimum.

It is a still further object of the invention to provide a D.C. torquer of the type described above which is highly efficient, small in size, easily assembled, and arranged for convenient inspection and repair.

It is a still further object of the invention to provide a D.C. torquer of the type described above having radially disposed magnets which enable more coils and turns per coil to be employed because of the greater area resulting from the radial positioning of the magnets.

Other objects and features of novelty of the present invention will be specifically pointed out or will otherwise become apparent when referring, for a better understanding of the invention, to the following description taken in conjunction with the accompanying drawings, wherein:

FIG. 3 is a cross-sectional view similar to that of FIG. 1 illustrating another embodiment of the invention;

FIG. 4 is a sectional view taken on the line 4—4 of FIG. 3; and

FIG. 5 is a cross-sectional view similar to that of FIG. 1 illustrating still another embodiment of the invention.

Figure 1:
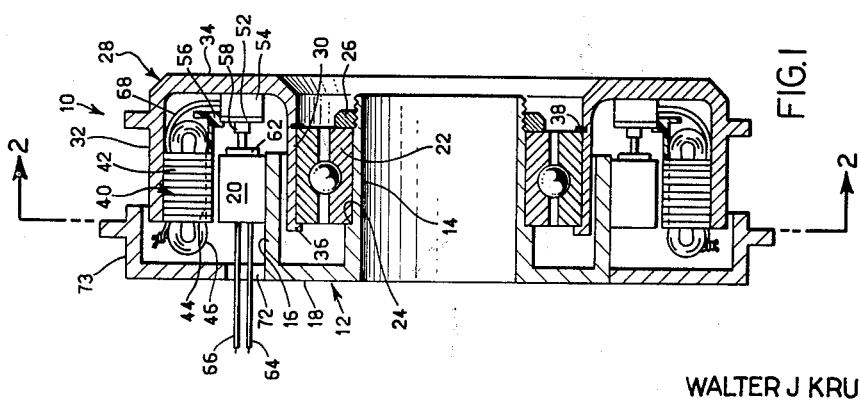
FIG. 1 is a cross-sectional view of a D.C. torquer embodying features of the invention.

Referring to FIG. 1, a D.C. torquer 10 embodying features of the invention is illustrated which comprises a stationary supporting member 12 made of highly permeable material and having inner and outer cylindrical walls 14 and 16 interconnected by a washer-shaped end wall 18. A plurality of permanent magnets 20 is mounted on the outer cylindrical wall 16 in circumferentially spaced relation in a suitable manner, such as by cementing, soldering, or otherwise securing them to the cylindrical wall. The oriented axes of each of the magnets are aligned radially and the poles are arranged as indicated in FIG. 2 so that every other one of the magnets has the north pole outwardly disposed and the remaining magnets have the south pole outwardly disposed.

A bearing 22 is mounted on the inner cylindrical wall 14 with the inner race thereof locked against a shoulder 24 by a nut 26 threaded on the right end of the inner cylindrical wall. A rotatable housing 28 of permeable material is rotatably mounted on the stationary member 12 by the bearing 22 and has inner and outer cylindrical walls 30 and 32 interconnected by a washer-shaped end wall 34. The inner cylindrical wall 30 is fixed to the outer race of the bearing 22 and has a lip 36 on the inner end thereof overlapping one end of the outer race of the bearing 22 and a snap ring 38 overlapping the other end of the outer race to fix the rotatable housing 28 against axial movement relative to the bearing 22. An armature subassembly 40 is mounted in the rotatable housing 28 for rotation therewith and can be inserted and removed from the rotatable housing as a unit. The armature subassembly 40 comprises a laminated armature ring 42 having a plurality of radially extending slots 44 circumferentially disposed thereabout which are closed at their inner ends and open at their outer ends, as illustrated in FIG. 2, the cylindrical wall 32 closing off these open ends. A plurality of coils 46 are positioned in the slots 44 with one side of each coil in one slot and the other side thereof in a slot one or more slots removed therefrom so that the coils overlap one another. The coils are series connected to produce a plurality of circumferentially spaced, radially extending magnetic fields, and the windings of certain coils are reversed so that alternate ones of the magnetic fields are reversed in polarity, the number of magnetic fields being equal to the number of permanent magnets 20.

A washer-shaped printed circuit commutator 52 having a washer-shaped insulating backing 54 abutting against the end wall 34 of the rotatable housing is supported on the laminated armature 42 by a ring 56 of suitable insulating material. The printed circuitry on the face of the commutator 52 is arranged to provide a plurality of separated arcuate commutator bars, one for each magnet 20. A plurality of leads 68 are preattached to the commutator 52 and each of the leads is connected to a separate commutator bar. Each lead 68 extends through the top of the slot 44 adjacent thereto and is connected to one or the other of the ends of the series connected coils 46 at juncture points positioned on the left side of the coils, as viewed in FIG. 1. At any given instant the brushes 58 engage a particular pair of the commutator bars on the printed circuit commutator 52 to connect the ends of the series connected coils to the D.C. source to produce the previously described radial magnetic fields. When the current flow through the leads 64 and 66 is reversed, the polarity of each of the radial magnetic fields is reversed.

Figure 2:
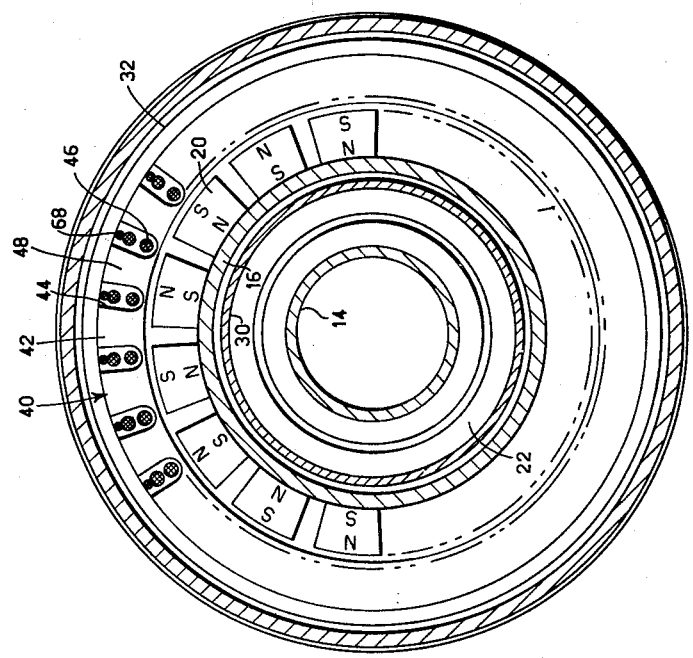
FIG. 2 is a sectional view taken on the line 2—2 of FIG. 1.

With this construction, and with a given direction of current flow through the leads 64 and 66, each of the coils 46 wound in one direction will be attracted in a clockwise direction as viewed in FIG. 2 to the north pole of the magnet 20 adjacent thereto and the remaining coils will be attracted in a clockwise direction to the south pole of the permanent magnet adjacent thereto so as to exert a clockwise torque on the rotatable housing 28. When the current through the coils is reversed, the torque will be reversed to rotate the rotatable housing 28 in a counter-clockwise direction. The printed circuit commutator bars on the face of the commutator 52 are arranged to cooperate with the brushes 58 to reverse the current flow through the coils when the radial magnetic fields produced thereby pass beyond positions centered over each of the magnets. For example, if the current flowing through the leads 64 and 66 is such as to energize the coils 46 to cause the rotatable housing 28 to rotate in a clockwise direction, the current through the coils would be reversed by the commutator 52 when the center of each of the radial magnetic fields produced by the coils passes the dead center position over its respective magnet 20. Consequently the coils which were being attracted in a clockwise direction toward a north pole would continue to be attracted in a clockwise direction by the next south pole, and the coils wound in the opposite direction so as to have been previously attracted in a clockwise direction toward a south pole would continue to be attracted in a clockwise by the next north pole. Stated otherwise, for a given direction of current through the leads 64 and 66, the torque generated is always clockwise and when the current in the leads 64 and 66 is reversed, the torque generated is always counter-clockwise, regardless of the position of the coils 46 relative to the magnets 20.

The stationary member 12 is made of highly permeable material so as to provide a good return path between the magnets 20 and the rotor housing 28 is also made of permeable material to provide a good magnetic return path and shield for the torquer 10. The remainder of the housing is provided by a cup-shaped cover of permeable material to provide additional magnetic shielding. The cover 73 is mounted on the outer cylindrical wall 16 of the stationary member 12 and is provided with a radial slot 72 to enable the leads 64 and 66 to pass therethrough. The cover 73 is suitably spaced from the armature coils 46 and the periphery of the rotatable housing 28 so as not to interfere with the rotation thereof.

The printed circuit commutator 52 provides a very small, light commutator, which requires very little axial space and enables more copper to be used in the armature coils to increase the efficiency of the torquer. Because the commutator is located as close to the axis of rotation of the housing as possible, brush friction torque is held to a minimum by virtue of the small radius arm. The use of the highly permeable material in the stationary member 12 eliminates the need for a stator return path and the use of the permeable material in the rotatable housing 28 and cover 73 eliminates the need for a separate magnetic shield. Thus a minimum amount of weight is added to the assembly because of the housing. The attachment of the brush assemblies to the magnets 20 uses space that is normally lost and enables the final space envelope to be held to a minimum. The removable cover 73 allows the magnets 20 to be transferred onto the outer cylindrical wall 16 of the stationary member with the assistance of a magnetic keeper so as to enable the magnets to be maintained at a high flux level with a consequent efficiency improvement. Further, by fixing the individual magnets 20 to the outer cylindrical wall 16 with the oriented axes of the magnets aligned radially, highly oriented magnet material with a high energy product can be utilized. Still further, by employing closed slots 44 in the laminated armature, the ripple torque is reduced to a minimum. By affixing the printed circuit commutator 52 directly to the laminated armature 42 by means of the insulated ring 56, the entire armature assembly can be wound and inserted into the housing as a completed subassembly.

Referring to FIGS. 3 and 4, a D.C. torquer 80 is shown which illustrates another embodiment of the invention. In this embodiment the permanent magnets 20 are positioned radially outwardly of the laminated armature ring 42 and are fixed to a cylindrical wall 82 of a highly permeable housing 84 having an inner cylindrical wall 86 fixed to the inner race of the bearing 22. The armature ring 42 is secured to an inner cylindrical wall 88 of a rotatable housing 90 of permeable material, and the printed circuit commutator 52 is supported thereon by an insulating ring 92 so as to form a complete subassembly as previously described. The spring loaded brushes 58 are also mounted on the end faces of the magnets by the insulating blocks 62 and connected to the lead wires 64 and 66, and the lead wires 68 are connected to the commutator 52 and pass through the slots 44 for connection to the ends of the coils, as previously described. Thus the torquer 80 functions in the same manner as the torquer 10 illustrated in FIG. 1 with the exception that the rotating armature subassembly is mounted radially inwardly of the permanent magnets 20.

Referring to FIG. 5, a D.C. torquer 100 is shown which illustrates still another embodiment of the invention wherein the laminated armature ring 42 and the printed circuit commutator 52 are stationary and interconnected by an insulating ring 102. They are inserted as a subassembly into a permeable stator housing 104 having an inner cylindrical wall 106 fixed to the inner race of the bearing 22. The lead wires 64 and 66 in this embodiment are connected directly to the brushes 114 and pass outwardly of the housing 112 through an opening 108 in the wall thereof. The lead wires 68 are connected to the ends of the coils, as previously described.

The magnets 20 are fixed on an inner cylindrical wall 110 of a highly permeable housing 112 which is fixed to the outer race of the bearing 22 for rotation therewith. A pair of electrically interconnected spring brushes 114 are mounted on the magnets 20 and slidably engage the printed circuitry on the face of the commutator 52. With this construction the circuit is completed from a D.C. source (not shown) through the lead wire 64, through one of the brushes 114, then to the printed circuit through one of the lead wires 68 to one end of the series connected coils 46 through the coils back to another of the lead wires 68, through the lead wires 68 back to the printed circuitry and finally through the lead wire 66 back to the D.C. source. The spring brushes cooperate with the printed circuit commutator to change the direction of the current through the coils 46 to ensure that for a given direction of current through the lead wires 64 and 66 the torque generated is always clockwise and for the opposite direction of current the torque generated is always counter-clockwise, regardless of the position of the coils relative to the permanent magnets 20.

While it will be apparent that the embodiments of the invention herein disclosed are well calculated to fulfill the objects of the invention, it will be appreciated that the invention is susceptible to modification, variation and change without departing from the proper scope or fair meaning of the subjoined claim.

What is claimed is:

A D.C. torquer comprising a stator of permeable material having an inner cylindrical wall and an outer cylindrical wall interconnected by a washer-shaped end wall, a bearing surrounding said inner cylindrical wall with the inner race thereof fixed to the wall, a plurality of permanent bar magnets circumferentially spaced about and projecting from said outer cylindrical wall with their poles aligned radially, a rotatable housing of permeable material having an inner cylindrical wall and an outer cylindrical wall interconnected by a washer-shaped end wall, the inner cylindrical wall of said housing being fitted about and secured to the outer race of said bearing with the outer cylindrical wall of the housing extending about and radially spaced from the exposed poles of said magnets, a laminated armature ring surrounding the exposed poles of said magnets to define an air gap thereabout and being secured within said outer cylindrical wall of the housing for rotation therewith, a plurality of coils circumferentially disposed on said armature ring having radially aligned axes, and commutator means for controlling the direction of current flow through said coils in response to the position of the coils relative to the magnets said commutator means including a washer-shaped printed circuit board encircling the inner cylindrical wall of said rotatable housing between said magnets and said washer-shaped end wall of said rotatable housing, and wires electrically connecting the printed circuit board to said armature coils, said wires extending through said slots to juncture points positioned on the side of the armature ring adjacent to the open end of said rotatable housing.

References Cited by the Examiner

UNITED STATES PATENTS

| | | | |
|---|---|---|---|
| 2,104,707 | 1/38 | Rawlings | 310—67.1 |
| 2,415,634 | 2/47 | Hill | 310—237 |
| 2,638,557 | 5/53 | Longert | 310—156 |
| 2,658,157 | 11/53 | Brouwer | 310—268 |
| 3,023,335 | 2/62 | Burr | 310—268 |

FOREIGN PATENTS 484,554  7/52  Canada.

MILTON O. HIRSHFIELD, *Primary Examiner.*